(12) United States Patent
Feng

(10) Patent No.: US 11,435,970 B2
(45) Date of Patent: Sep. 6, 2022

(54) ELECTRONIC FACE MASK CONTROL SYSTEM

(71) Applicant: SHENZHEN SHINING BRIGHT TECHNOLOGY CO., LTD, Shenzhen (CN)

(72) Inventor: Guofeng Feng, Shenzhen (CN)

(73) Assignee: SHENZHEN SHINING BRIGHT TECHNOLOGY CO., LTD, Shenzhen (CN)

(*) Notice: Subject to any disclaimer, the term of this patent is extended or adjusted under 35 U.S.C. 154(b) by 0 days.

(21) Appl. No.: 17/485,486

(22) Filed: Sep. 26, 2021

(65) Prior Publication Data

US 2022/0113922 A1 Apr. 14, 2022

(30) Foreign Application Priority Data

Oct. 10, 2020 (CN) .......................... 202011077516.8

(51) Int. Cl.
| | |
|---|---|
| *G06F 3/14* | (2006.01) |
| *G09G 5/00* | (2006.01) |
| *G09F 9/33* | (2006.01) |
| *G09F 21/02* | (2006.01) |
| *G09G 3/32* | (2016.01) |

(52) U.S. Cl.
CPC ................. *G06F 3/14* (2013.01); *G09F 9/33* (2013.01); *G09F 21/026* (2013.01); *G09G 3/32* (2013.01)

(58) Field of Classification Search
CPC .................................................. G09F 13/0404
See application file for complete search history.

(56) References Cited

U.S. PATENT DOCUMENTS

| | | | |
|---|---|---|---|
| 2003/0115010 A1* | 6/2003 | Estep ...................... | B63C 11/12 702/127 |
| 2013/0214998 A1* | 8/2013 | Andes ...................... | G09G 5/10 345/8 |
| 2017/0196761 A1* | 7/2017 | Hyde ................... | A61H 9/0057 |
| 2018/0000179 A1* | 1/2018 | Simon ..................... | G06F 3/147 |

* cited by examiner

*Primary Examiner* — Nan-Ying Yang

(57) ABSTRACT

An electronic face mask control system includes an electronic face mask. The electronic face mask includes an LED screen configured to display images, a first driving device configured to control an operation of the LED screen, a first detecting device connected with the first driving device, and a first storage device connected to the first driving device. The first detecting device is configured to detect control signals. The first storage device is configured to storage local data. By performing signal detection on the first detecting device, a display content controlled by the first driving device is changed, and a display content of the LED screen is changed.

16 Claims, 2 Drawing Sheets

ELECTRONIC FACE MASK CONTROL SYSTEM

TECHNICAL FIELD

The present disclosure relates to a field of face mask technology, and in particular to an electronic face mask control system.

BACKGROUND

An electronic face mask equipped with an LED screen on the market has a single function, and generally only displays predetermined content. A user lacks interaction with the electronic face mask. When modifying the display content of the electronic face mask, it is required to reconnect the data cable and modify information on the electronic face mask, which is a poor experience during actual use.

SUMMARY

In order to solve above-mentioned problems in the prior art, the present disclosure provides an electronic face mask control system. The electronic face mask control system comprises an electronic face mask. The electronic face mask comprises an LED screen configured to display images, a first driving device configured to control an operation of the LED screen, and a first detecting device connected with the first driving device. The first detecting device is configured to detect control signals.

Furthermore, one or more of a gesture recognition module, a distance measuring module, a portrait recognition module, a speech recognition module, and a touch switch module are integrated on the first detecting device.

Furthermore, the electronic face mask control system further comprises a remote control. The electronic face mask further comprises a first communication device. The remote control comprises a second driving device configured to control an operation of the remote control, a second communication device connected to the second driving device, and second detecting device connected to the second driving device. The second communication device is configured to communicate with the first communication device. The second detecting device is configured to sense user operations and generate corresponding operation instructions to send to the second driving device.

Furthermore, the electronic face mask control system further comprises a cloud database, and the second communication device is communicated with the first communication device through the cloud database.

Furthermore, the first driving device comprises a first storage device configured to store local data of the electronic face mask, and/or the second driving device comprises a second storage device configured to store local data of the remote control.

Furthermore, the electronic face mask further comprises a first power supply device arranged in the electronic face mask. The first power supply device is configured to supply power to the electronic face mask. The first power supply device is a rechargeable battery and/or a battery groove.

Furthermore, the remote control further comprises a second power supply device arranged in the remote control. The second power supply device provides power to the remote control. The second power supply device is a rechargeable battery and/or a battery groove.

Furthermore, the second detecting device is a touch screen or a drawing board. The second detecting device is configured to sense an input of hand-drawn information.

Furthermore, the first communication device is communicated with the second communication device through a data cable and/or wireless communication protocols.

Furthermore, both of the first communication device and the second communication device comprise one or more of a 3G/4G/5G module, a BLUETOOTH module, a WIFI module, a ZIGBEE module, and an NFC module.

The technical solution of the present disclosure solves a problem in the prior art that display contents of a conventional electronic face mask are fixed and are cumbersome to adjust. In the present disclosure, the electronic face mask control system comprises the electronic face mask. The electronic face mask comprises the LED screen configured to display images, the first driving device configured to control the operation of the LED screen, the first detecting device connected with the first driving device, and the first storage device connected with the first driving device and configured to store the local data of the electronic face mask. The first detecting device is configured to detect control signals. The first detecting device performs signal detection to realize change of driving contents of the first driving device, thereby display contents displayed on the LED screen.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor. In the drawing.

DETAILED DESCRIPTION

Technical solutions in the embodiments of the present disclosure will be clearly and completely described below in conjunction with the accompanying drawings in the embodiments of the present disclosure. Obviously, the described embodiments are only parts of the embodiments of the present disclosure, rather than all the embodiments. Based on the embodiments of the present disclosure, all other embodiments obtained by those of ordinary skill in the art without creative work shall fall within the protection scope of the present disclosure.

It should be noted in the description of the present disclosure that, unless otherwise regulated and defined, terms such as "installation," "bonded," and "bonding" shall be understood in broad sense, and for example, may refer to fixed bonding or detachable bonding or integral bonding; may refer to mechanical bonding or electrical bonding; and may refer to direct bonding or indirect bonding through an intermediate medium or inner communication of two elements. For those of ordinary skill in the art, the meanings of the above terms in the present disclosure may be understood according to concrete conditions.

In the present disclosure, unless otherwise clearly defined and limited. The terms that a first feature is arranged "on" or "under" a second feature may be understood as the first features directly contacts the second features, or the first feature does not directly contact the second features and connected through other features between them. Moreover, the terms that the first feature is arranged "above", "over" and "on" the second feature may be understood as that the first feature being directly above and obliquely above the second feature, or it simply means that a level of the first feature is greater than that of the second feature. The terms that the first feature is arranged "below", "under" and "beneath" the second feature may be understood as that the first feature is arranged directly below and obliquely below the second feature, or it simply means that the level of the first feature is less than the second feature.

The present disclosure will be further described in detail through specific embodiments in conjunction with the accompanying drawings.

Figure 1:
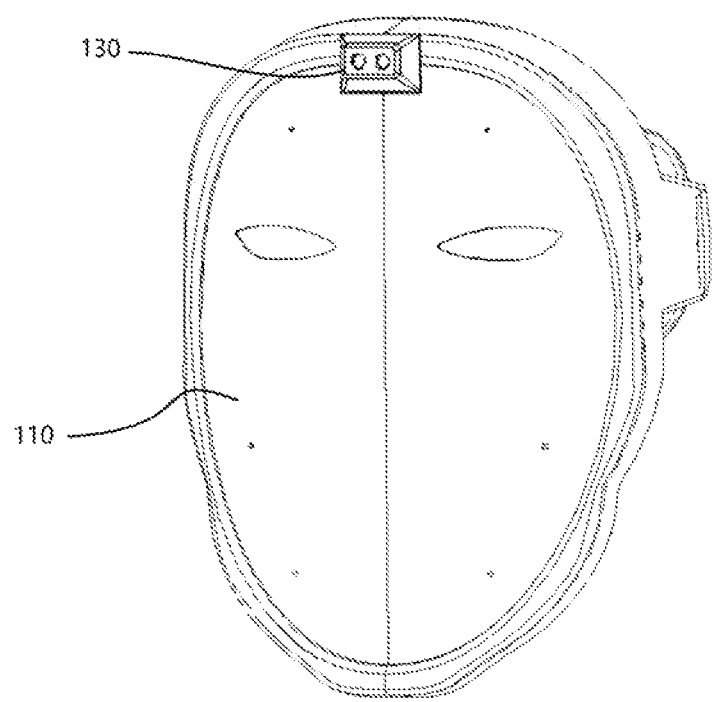
FIG. 1 is a schematic diagram of an electronic face mask control system according to one embodiment of the present disclosure.
Figure 2:
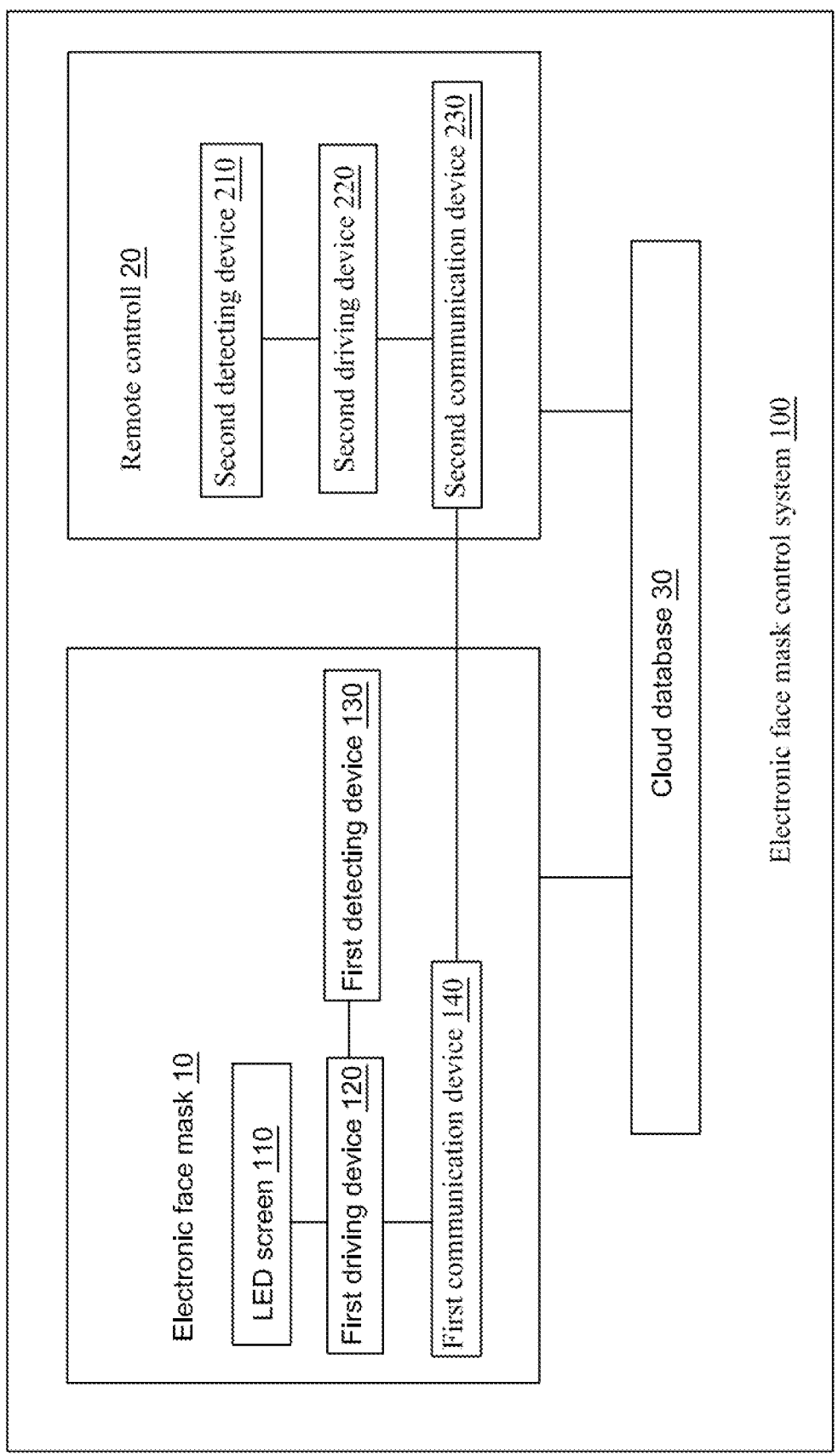
FIG. 2 is a schematic diagram showing a connection relationship of the electronic face mask control system according to one embodiment of the present disclosure.

As shown in FIGS. 1 and 2, the present disclosure provides an electronic face mask control system 100. The electronic face mask control system 100 comprises an electronic face mask 10. The electronic face mask 10 comprises an LED screen 110 configured to display images, a first driving device 120 configured to control an operation of the LED screen 110, and a first detecting device 130 connected with the first driving device 120. The first detecting device 130 is configured to detect control signals. The LED screen 110 may be an LED matrix display module or a curved LED screen, which is arranged on a front portion of the electronic face mask. One or more of a gesture recognition module, a distance measuring module, a portrait recognition module, a speech recognition module, and a touch switch module are integrated on the first detecting device 130. In one optional embodiment that shown in FIG. 1, the first detecting device is an infrared gesture recognition module, which includes an infrared transmitter, an infrared receiver, and an analysis module. The first detecting device is configured to detect a gesture of a user's hand at a certain distance. By combination judgment in left, right, front, rear, or other directions, the first driving device performs different operations (such as switching to a next LED matrix light group pattern, switching to a previous LED matrix light group pattern, turning on the electronic face mask, turning off the electronic face mask, or other customize operation settings according to user requirements) by receiving information processed by the first detecting device to achieve a touch-free transformation and achieve an approximate effect of the Sichuan Opera's face change.

The first driving device may comprises a key switch and it is triggered by touching the key switch arranged on the electronic face mask. The first driving device may comprise the portrait recognition module. When a portrait is detected, the electronic face mask automatically switches to a specific screen. Or, predetermined patterns of a person or objects are stored in the electronic face mask, so that when the electronic face mask is close to a certain person or a certain object, a certain image is displayed.

In one optional embodiment, the electronic face mask control system further comprises a remote control 20. The electronic face mask further comprises a first communication device 140. The remote control 20 comprises a second driving device 220 configured to control an operation of the remote control, a second communication device 230 connected to the second driving device 220, and second detecting device connected to the second driving device. The second communication device 230 is configured to communicate with the first communication device. The second detecting device 210 is configured to sense user operations and generate corresponding operation instructions to send to the second driving device.

The remote control is a specific touch device, which is placed in the user's pocket or hand through a wired connection, or the remote control is remotely controlled through a wireless connection. The remote control transfers some functions, thereby reducing a weight of the electronic face mask and making it convenient for the wearer to use. The remote control is selected from a button-type trigger remote control, a smart mobile device, a computer or other terminals.

The remote control eliminates a need for a separate LED control system, which effectively improves a use efficiency. The remote control eliminates connections between the electronic face mask and complicated network cables, serial cables, and video source cables, which effectively simplifies a structure of the electronic face mask and facilitates operations. The remote control saves users from building their own complex server system, which effectively reduces costs and solves resources. The remote control, such as the smart mobile device, is able to perform a switch operation in real time between the LED screens, which effectively improves control efficiency. Through the smart mobile device, the user can not only adjust parameters of the LED screen, but also publish videos or images to the LED screen and display them through the LED screen, which is simple and convenient. Through the remote control, the user is also able to interact with the LED screen in real time, sent bullet screens, emoticons, or AR interactions. At the same time, a single remote control is able to control display contents of multiple electronic face masks, or multiple remote controls are able to control a single electronic face mask.

In one optional embodiment, the electronic face mask control system further comprises a cloud database 30, and the second communication device is communicated with the first communication device through the cloud database 30. In one embodiment, before the remote control is ready to send a program to the LED screen, the second communication device first determines whether the remote control and the LED screen of the electronic face mask control system are in a same local area network. If the remote control and the LED screen are in the same local area network, an image to be displayed by the electronic face mask is transmitted directly through the local area network. At this time, the data of the image to be displayed is no need to transit through the cloud database, and a transmission speed in the local area network is greater than a transmission speed of the cloud database through the external network, which greatly improves an efficiency of publishing the image to be displayed. At the same time, when the image to be displayed is transmitted, the LED screen automatically updates historical images to the cloud database through the first communication device. If the remote control and the LED screen are not in the same local area network, the remote control first transmits the image to be displayed to the cloud database, and then the cloud database send the image to be displayed to the electronic face mask where the designated LED screen is arranged. When the remote control is communicated with the electronic face mask, a seamless switching between the local area network and the external network, which is convenient for users to use. Moreover, the cloud database is also configured to store intermediate data and perform data caching.

In one optional embodiment, the first driving device comprises a first storage device configured to store local data of the electronic face mask, and/or the second driving device comprises a second storage device configured to store local data of the remote control. The first storage device and the second storage device perform data caching according to actual deployment needs. The first storage device and the second storage device may exist separately and are configured to storage the image to be displayed and perform data caching in the local area network. The first storage device is separately arranged in the electronic face mask, so the first storage device could be used offline, that is, it does not rely on the network, the cloud database, or the remote control.

In one optional embodiment, the electronic face mask further comprises a first power supply device arranged in the electronic face mask. The first power supply device is configured to supply power to the electronic face mask. The first power supply device is a rechargeable battery and/or a battery groove. The electronic face mask equipped with the first power supply device realizes wireless operation. The power is supplied by the rechargeable battery, a combined power supply mode of disposable batteries and rechargeable battery, or the disposable batteries according to the actual use, so the electronic face mask is able to cope with different usage scenarios.

In one optional embodiment, the remote control further comprises a second power supply device arranged in the remote control. The second power supply device provides power to the remote control. The second power supply device is a rechargeable battery and/or a battery groove. The remote control equipped with the second power supply device realizes wireless operation. The power is supplied by the rechargeable battery, a combined power supply mode of disposable batteries and rechargeable battery, or the disposable batteries according to the actual use, so the remote control is able to cope with different usage scenarios.

In one optional embodiment, the second detecting device is a touch screen or a drawing board. The second detecting device is configured to sense an input of hand-drawn information. The remote control is selected from a mobile cellular phone, a tablet mobile device, or a writing pad. Non-standard text contents are input through the touch screen or the drawing board, so that the non-standard text contents are directly displayed on the electronic face mask.

In one optional embodiment, the first communication device is communicated with the second communication device through a data cable and/or wireless communication protocols. A communication method is selected from a wired connection that realized by the data cable, so the rechargeable battery is charged when it connected with the data cable. When the first communication device is wirelessly communicated with the second communication device, a communication medium is switched to a remote communication module.

In one optional embodiment, both of the first communication device and the second communication device comprise one or more of a 3G/4G/5G module, a BLUETOOTH module, a WIFI module, a ZIGBEE module, and an NFC module. For example, the remote control is communicated with the cloud database via the BLUETOOTH module, and the LED screen is communicates with the cloud database via the WIFI module, the ZIGBEE module or other communication modules.

Therefore, in the embodiment, various types of communication modules are listed, they are not only lists of communication modules in the prior art, but also play an important role in the electronic face mask control system. During a transmission link, when one of the communication modules fails, other communication modules are able to realize complete communication through the cloud database.

It should be noted that wireless communication methods, the touch screen, the drawing board, the cloud database, etc. may adopt any technical solutions in the prior art. Technical solutions obtained by combination of the technical solutions disclosed in the present disclosure and the prior art are all within the scope of protection of the present disclosure.

In the description of the specification, descriptions of the reference terms "one embodiment", "some embodiments", "one implement", "some implements", "examples", "specific examples", or "some examples", etc. mean that the specific feature, structure, material or characteristic described in combination with the embodiment or example is included in at least one embodiment or example of the present disclosure. In the specification, the schematic representations of the above-mentioned terms do not necessarily refer to the same embodiment or example. Moreover, the described specific features, structures, materials or characteristics can be combined in any one or more embodiments or examples in a suitable manner.

The above content is a further detailed description of the present disclosure in conjunction with specific implementations, and it cannot be considered that the specific implementations of the present disclosure are limited to these descriptions. For those of ordinary skill in the field to which the present disclosure belongs, several simple deductions or substitutions can be made without departing from the concept of the present disclosure.

It should be pointed out that the above are only some optional embodiments of the present disclosure and are not intended to limit the present disclosure. Any modification, equivalent replacement, improvement, etc. made within the spirit and principle of the present disclosure shall be included in the protection scope of the present disclosure

What is claimed is:

1. An electronic face mask control system, comprising: an electronic face mask;
wherein the electronic face mask comprises a light emitting diode (LED) screen configured to display images, a first driving device configured to control an operation of the LED screen, and a first detecting device connected with the first driving device; the first detecting device is configured to detect control signals;
wherein the first driving device and the first detecting device are both integrated with a main body of the electronic face mask, wherein the first detecting device is arranged at a top middle of a forehead of the electronic face mask;
wherein the electronic face mask control system further comprises a remote control; the electronic face mask further comprises a first communication device; the remote control comprises a second driving device configured to control an operation of the remote control, a second communication device connected to the second driving device, and second detecting device connected to the second driving device; the second communication device is configured to communicate with the first communication device; the second detecting device is configured to sense user operations and generate corresponding operation instructions to send to the second driving device;
wherein the electronic face mask control system further comprises a cloud database, and the second communication device is communicated with the first communication device through the cloud database, wherein the second communication device is configured to first determine whether the remote control and the electronic face mask having the LED screen are located in a same local area network before the remote control is ready to send a program to the LED screen, and in response to determining that the remote control and the electronic face mask are located in the same local area network, an image to be displayed by the electronic face mask is transmitted directly through the local area network to the electronic fact mask to be displayed on the LED screen, and wherein while the image to be displayed is transmitted, the LED screen is configured to automatically update historical images to the cloud database through the first communication device;

otherwise in response to determining that the remote control and the electronic face mask are not located in the same local area network, the remote control is configured to first transmit the image to be displayed to the cloud database, which then sends the image to the electronic face mask for display on the LED screen.

2. The electronic face mask control system according to claim 1, wherein the first driving device comprises a first storage device configured to store local data of the electronic face mask, and/or the second driving device comprises a second storage device configured to store local data of the remote control.

3. The electronic face mask control system according to claim 1, wherein the electronic face mask further comprises a first power supply device arranged in the electronic face mask; the first power supply device is configured to supply power to the electronic face mask; the first power supply device is a rechargeable battery and/or a battery groove.

4. The electronic face mask control system according to claim 1, wherein the remote control further comprises a second power supply device arranged in the remote control; the second power supply device provides power to the remote control; the second power supply device is a rechargeable battery and/or a battery groove.

5. The electronic face mask control system according to claim 1, wherein the second detecting device is a touch screen; the second detecting device is configured to sense an input of hand-drawn information.

6. The electronic face mask control system according to claim 1, wherein the first communication device is communicated with the second communication device through a data cable and/or wireless communication protocols.

7. The electronic face mask control system according to claim 1, wherein both of the first communication device and the second communication device comprise one or more of a 3G/4G/5G module, a BLUETOOTH module, a WIFI module, a ZIGBEE module, and an NFC module.

8. The electronic face mask control system according to claim 1, wherein the first detecting device comprises a gesture recognition module configured to detect a gesture of a user's hand at a certain distance and control the LED screen of the electronic face mask to perform a corresponding display operation depending on characteristics of the gesture.

9. The electronic face mask control system according to claim 8, wherein the corresponding display operation performed by the LED screen comprises switching to a next LED matrix light group pattern, switching to a previous LED matrix light group pattern, turning on the electronic face mask, or turning off the electronic face mask.

10. The electronic face mask control system according to claim 8, wherein the corresponding display operation performed by the LED screen comprises a user-customized display operation.

11. The electronic face mask control system according to claim 1, wherein the first detecting device comprises a distance measuring module.

12. The electronic face mask control system according to claim 1, wherein the first detecting device comprises a portrait face recognition module configured to detect a human face, and accordingly control the LED screen of the electronic face mask to automatically switch to a specific screen in response to detecting a human face.

13. The electronic face mask control system according to claim 1, wherein the electronic face mask is configured to store a predetermined pattern of a person or object, wherein the first detecting device comprises a portrait face recognition module configured to detect a portrait, and accordingly control the LED screen of the electronic face mask to display a predetermined image in response to detecting that the electronic face mask is in proximity with a certain person or object.

14. The electronic face mask control system according to claim 1, wherein the first detecting device comprises a speech recognition module.

15. The electronic face mask control system according to claim 1, wherein the first detecting device comprises a touch switch module.

16. The electronic face mask control system according to claim 1, wherein the second detecting device is a drawing board; the second detecting device is configured to sense an input of hand-drawn information.

* * * * *